(12) United States Patent
Kaneko

(10) Patent No.: US 10,584,057 B2
(45) Date of Patent: Mar. 10, 2020

(54) GLASS-CERAMIC-FERRITE COMPOSITION AND ELECTRONIC COMPONENT

(71) Applicant: Murata Manufacturing Co., Ltd., Kyoto-fu (JP)

(72) Inventor: Kazuhiro Kaneko, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 16/186,253

(22) Filed: Nov. 9, 2018

(65) Prior Publication Data

US 2019/0161398 A1 May 30, 2019

(30) Foreign Application Priority Data

Nov. 29, 2017 (JP) ................. 2017-229289

(51) Int. Cl.
*C03C 10/00* (2006.01)
*H01B 3/08* (2006.01)
(Continued)

(52) U.S. Cl.
CPC .......... *C03C 10/0081* (2013.01); *C03C 3/089* (2013.01); *C03C 3/091* (2013.01); *C03C 10/0027* (2013.01); *C03C 10/0054* (2013.01); *C03C 14/004* (2013.01); *C04B 35/265* (2013.01); *H01B 3/087* (2013.01); *H01B 3/12* (2013.01); *C03C 2203/10* (2013.01); *C03C 2214/04* (2013.01); *C04B 2235/3418* (2013.01); *C04B 2235/3445* (2013.01); *C04B 2235/365* (2013.01); *C04B 2235/6025* (2013.01);
(Continued)

(58) Field of Classification Search
None
See application file for complete search history.

(56) References Cited

U.S. PATENT DOCUMENTS 6,008,151 A * 12/1999 Sasaki ................. C03C 10/0054
501/17
9,305,690 B2 * 4/2016 Choto .................... H01F 1/401
(Continued)

FOREIGN PATENT DOCUMENTS

JP 2002175916 A * 6/2002
JP 2014-220469 A 11/2014

OTHER PUBLICATIONS

Machine Translation of JP 2002-175916 A. (Year: 2002).*

*Primary Examiner* — Kevin M Bernatz
(74) *Attorney, Agent, or Firm* — Studebaker & Brackett PC

(57) ABSTRACT

A glass-ceramic-ferrite composition contains glass, a ceramic filler, and Ni—Zn—Cu ferrite. The glass contains about 0.5% by weight or more of $R_2O$, where R is at least one selected from the group consisting of Li, Na, and K; about 5.0% by weight or less of $Al_2O_3$; about 10.0% by weight or more of $B_2O_3$; and about 85.0% by weight or less of $SiO_2$ on the basis of the weight of the glass. The Ni—Zn—Cu ferrite accounts for about 58% to 64% by weight of the glass-ceramic-ferrite composition. The ceramic filler contains quartz and, in some cases, forsterite. The quartz accounts for about 4% to 13% by weight of the glass-ceramic-ferrite composition. The forsterite accounts for about 6% by weight or less of the glass-ceramic-ferrite composition.

20 Claims, 1 Drawing Sheet

(51) Int. Cl.
*H01B 3/12* (2006.01)
*C03C 14/00* (2006.01)
*C04B 35/26* (2006.01)
*C03C 3/091* (2006.01)
*C03C 3/089* (2006.01)

(52) U.S. Cl.
CPC .. *C04B 2235/6584* (2013.01); *C04B 2235/77* (2013.01); *C04B 2235/80* (2013.01); *C04B 2235/96* (2013.01); *C04B 2235/9607* (2013.01)

(56) References Cited

U.S. PATENT DOCUMENTS

| | | | |
|---|---|---|---|
| 2009/0278627 A1* | 11/2009 | Umemoto | C04B 35/18 333/185 |
| 2011/0018671 A1* | 1/2011 | Kamei | C03C 3/066 336/200 |
| 2014/0362491 A1* | 12/2014 | Adachi | H01G 4/105 361/270 |
| 2017/0345543 A1* | 11/2017 | Soda | H01F 3/08 |

* cited by examiner

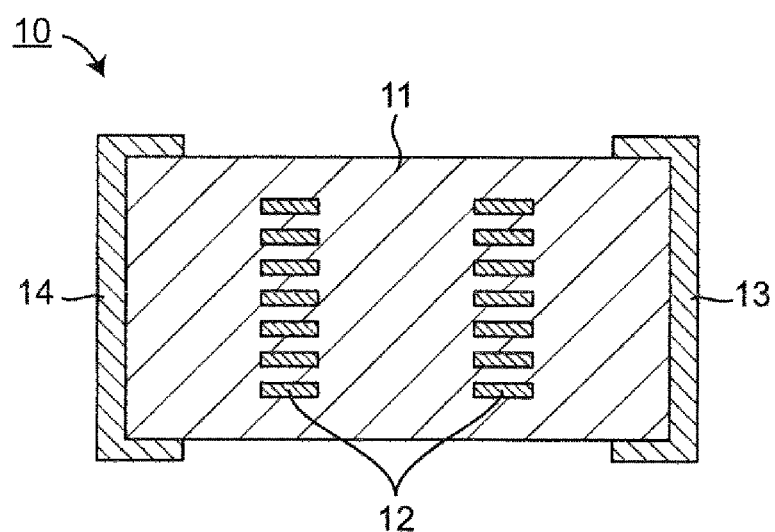

GLASS-CERAMIC-FERRITE COMPOSITION AND ELECTRONIC COMPONENT

CROSS-REFERENCE TO RELATED APPLICATION

This application claims benefit of priority to Japanese Patent Application No. 2017-229289, filed Nov. 29, 2017, the entire content of which is incorporated herein by reference.

BACKGROUND

Technical Field

The present disclosure relates to a glass-ceramic-ferrite composition and an electronic component containing the same.

Background Art

Coil components have been widely used for noise suppression for electronic devices and the like. The following component has been proposed as a coil component: an electronic component including an element body made of a magnetic composition containing ferrite and a coil conductor embedded in the element body.

Japanese Unexamined Patent Application Publication No. 2014-220469 discloses a composite ferrite composition containing a magnetic material and a nonmagnetic material. The mixing ratio of the magnetic material to the nonmagnetic material is about 20%:80% to about 80%:20% on a weight basis. The magnetic material is Ni—Cu—Zn ferrite. A major component of the nonmagnetic material contains an oxide of Zn, Cu, and Si. A minor component of the nonmagnetic material contains borosilicate glass.

In recent years, electronic components which have high flexural strength, which are unlikely to crack, and which have high reliability have been required. Therefore, materials having higher flexural strength are required as materials for forming element bodies of electronic components. On the other hand, electronic components capable of removing noise at a high frequency of several gigahertzes, for example, about 5 GHz, are required. At high frequencies, variations in magnetic characteristics of electronic components need to be small. Therefore, a magnetic material with a small rate of variation in relative permeability at high frequencies is required.

SUMMARY

Accordingly, the present disclosure provides a magnetic material which has high flexural strength and a small rate of variation in relative permeability at high frequencies and an electronic component containing the magnetic material.

The inventor has carried out intensive investigations to achieve the above object. As a result, the inventor has found that a magnetic material having a specific peak in an X-ray diffraction pattern, the full width at half maximum of the specific peak being within a predetermined numerical range, has high flexural strength and a small rate of variation in relative permeability at a high frequency of several gigahertzes (for example, about 5 GHz), thereby completing the present disclosure.

According to preferred embodiments of the present disclosure, a glass-ceramic-ferrite composition contains glass, a ceramic filler, and Ni—Zn—Cu ferrite. The glass-ceramic-ferrite composition has a peak corresponding to the (511) plane of a magnetite phase in an X-ray diffraction pattern determined using a Cu Kα radiation and the full width at half maximum of the peak is about 0.38° to 0.56°. The glass contains about 0.5% by weight or more of $R_2O$, where R is at least one selected from the group consisting of Li, Na, and K; about 5.0% by weight or less of $Al_2O_3$; about 10.0% by weight or more of $B_2O_3$; and about 85.0% by weight or less of $SiO_2$ on the basis of the weight of the glass. The Ni—Zn—Cu ferrite accounts for about 58% to 64% by weight of the glass-ceramic-ferrite composition. The ceramic filler contains quartz and, in some cases, forsterite. The quartz accounts for about 4% to 13% by weight of the glass-ceramic-ferrite composition. The forsterite accounts for about 6% by weight or less of the glass-ceramic-ferrite composition.

According to preferred embodiments of the present disclosure, a glass-ceramic-ferrite composition contains glass, a ceramic filler, and Ni—Zn—Cu ferrite. The glass-ceramic-ferrite composition has a peak corresponding to the (511) plane of a magnetite phase in an X-ray diffraction pattern determined using a Cu Kα radiation and the full width at half maximum of the peak is about 0.38° to 0.56°. The glass is borosilicate glass containing R, where R is at least one selected from the group consisting of Li, Na, and K, and, in some cases, Al and contains about 0.5% by weight or more of R in terms of $R_2O$, about 2.6% by weight or less of Al, about 3.1% by weight or more of B, and about 39.7% by weight or less of Si on the basis of the weight of the glass. The Ni—Zn—Cu ferrite accounts for about 58% to 64% by weight of the glass-ceramic-ferrite composition. The ceramic filler contains quartz and, in some cases, forsterite. The quartz accounts for about 4% to 13% by weight of the glass-ceramic-ferrite composition. The forsterite accounts for about 6% by weight or less of the glass-ceramic-ferrite composition.

According to preferred embodiments of the present disclosure, an electronic component includes an element body containing at least one of the above glass-ceramic-ferrite compositions and an inner conductor placed in the element body.

According to preferred embodiments of the present disclosure, a method for producing a glass-ceramic-ferrite composition having a peak corresponding to the (511) plane of a magnetite phase in an X-ray diffraction pattern determined using a Cu Kα radiation, the full width at half maximum of the peak being about 0.38° to 0.56°, includes preparing a mixture containing glass, a ceramic filler, and Ni—Zn—Cu ferrite and firing the mixture to obtain the glass-ceramic-ferrite composition. The glass contains about 0.5% by weight or more of $R_2O$, where R is at least one selected from the group consisting of Li, Na, and K; about 5.0% by weight or less of $Al_2O_3$; about 10.0% by weight or more of $B_2O_3$; and about 85.0% by weight or less of $SiO_2$ on the basis of the weight of the glass. The Ni—Zn—Cu ferrite accounts for about 58% to 64% by weight of the mixture. The ceramic filler contains quartz and, in some cases, forsterite. The quartz accounts for about 4% to 13% by weight of the mixture. The forsterite accounts for about 6% by weight or less of the mixture.

According to preferred embodiments of the present disclosure, a method for manufacturing an electronic component which includes an element body containing a glass-ceramic-ferrite composition and an inner conductor placed in the element body and which has a peak corresponding to the (511) plane of a magnetite phase in an X-ray diffraction pattern determined using a Cu Kα radiation, the full width at half maximum of the peak being about 0.38° to 0.56°, includes preparing a mixture containing glass, a ceramic filler, and Ni—Zn—Cu ferrite; forming the mixture into sheets; forming a conductive pattern on the sheets using a conductive paste; stacking the sheets provided with the conductive pattern to form a multilayer body; and firing the multilayer body to obtain the electronic component, which includes the element body containing the glass-ceramic-ferrite composition and the inner conductor placed in the element body. The glass contains about 0.5% by weight or more of $R_2O$, where R is at least one selected from the group consisting of Li, Na, and K; about 5.0% by weight or less of $Al_2O_3$; about 10.0% by weight or more of $B_2O_3$; and about 85.0% by weight or less of $SiO_2$ on the basis of the weight of the glass. The Ni—Zn—Cu ferrite accounts for about 58% to 64% by weight of the mixture. The ceramic filler contains quartz and, in some cases, forsterite. The quartz accounts for about 4% to 13% by weight of the mixture. The forsterite accounts for about 6% by weight or less of the mixture.

A glass-ceramic-ferrite composition according to a preferred embodiment of the present disclosure has the about feature and therefore has high flexural strength and a small rate of variation in relative permeability at a high frequency of several gigahertzes, for example, about 5 GHz. An electronic component according to a preferred embodiment of the present disclosure has the about feature and therefore has high flexural strength and small variations in magnetic characteristics at high frequencies. A method for producing a glass-ceramic-ferrite composition according to a preferred embodiment of the present disclosure has the about feature and therefore can produce a glass-ceramic-ferrite composition having high flexural strength and a small rate of variation in relative permeability at high frequencies. A method for manufacturing an electronic component according to a preferred embodiment of the present disclosure has the about feature and therefore can manufacture an electronic component having high flexural strength and small variations in magnetic characteristics at high frequencies.

Other features, elements, characteristics and advantages of the present disclosure will become more apparent from the following detailed description of preferred embodiments of the present disclosure with reference to the attached drawing.

BRIEF DESCRIPTION OF THE DRAWING

The FIGURE is a schematic sectional view of an example of an electronic component according to an embodiment of the present disclosure.

DETAILED DESCRIPTION

Embodiments of the present disclosure will now be described with reference to the attached drawing. The embodiments below are for illustrative purposes only. The present disclosure is not limited to the embodiments below. The size, material, shape, relative arrangement, and the like of constituent components described below are not intended to limit the scope of the present disclosure thereto unless otherwise specified and are merely illustrative examples. The size, shape, positional relationship, and the like of constituent components shown in the drawing may be exaggerated for the sake of clarity.

Glass-Ceramic-Ferrite Composition

A glass-ceramic-ferrite composition according to an embodiment of the present disclosure contains glass, a ceramic filler, and Ni—Zn—Cu ferrite. The glass-ceramic-ferrite composition is hereinafter simply referred to as the "composition" in some cases.

The glass-ceramic-ferrite composition can be fired at a firing temperature of about 930° C. or less, at which co-firing with Ag is possible, in the case of using an inner conductor containing Ag. In the case of using the inner conductor containing Ag, firing needs to be performed at a temperature lower than the melting point of Ag. When a composition contains only ceramic materials such as steatite, alumina, forsterite, and zirconia in addition to Ni—Zn—Cu ferrite, the sintering temperature of the composition is high and therefore it is probably difficult to sinter the composition at a firing temperature of about 930° C. or less, at which co-firing with Ag is possible. However, the glass-ceramic-ferrite composition contains the glass and therefore can be sintered at a firing temperature of about 930° C. or less.

The glass used may be borosilicate glass ($R_2O$—$SiO_2$—$B_2O_3$—$Al_2O_3$ glass) containing R and, in some cases, Al, where R represents an alkali metal element and is at least one selected from the group consisting of Li, Na, and K. It is conceivable that R and Al are contained in the glass in the form of the oxides $R_2O$ and $Al_2O_3$, respectively. However, R and Al need not be contained in the glass in the form of the oxides $R_2O$ and $Al_2O_3$, respectively. The composition of the glass can be expressed with the content of each of $R_2O$, $Al_2O_3$, $B_2O_3$, and $SiO_2$ as described below.

The glass contains about 0.5% by weight or more of $R_2O$, where R is at least one selected from the group consisting of Li, Na, and K; about 5.0% by weight or less of $Al_2O_3$; about 10.0% by weight or more of $B_2O_3$; and about 85.0% by weight or less of $SiO_2$ on the basis of the weight of the glass. Alternatively, the composition of the glass can be expressed with the content of each of R, Al, B, and Si as described below. The glass contains about 0.5% by weight or more of R in terms of $R_2O$, about 2.6% by weight or less of Al, about 3.1% by weight or more of B, and about 39.7% by weight or less of Si on the basis of the weight of the glass. When the composition of the glass is within the above range, the composition can be sintered at a firing temperature of about 930° C. or less, at which co-firing with Ag is possible.

The glass preferably contains about 5.0% by weight or less of $R_2O$ on the basis of the weight of the glass. In other words, the glass preferably contains about 5.0% by weight or less of R in terms of $R_2O$ on the basis of the weight of the glass. When the composition of the glass is within the above range, the glass-ceramic-ferrite composition can have increased flexural strength.

The glass preferably contains about 2.0% by weight or more of $Al_2O_3$ on the basis of the weight of the glass. In other words, the glass preferably contains about 1.0% by weight or more of Al on the basis of the weight of the glass. When the composition of the glass is within the above range, the glass-ceramic-ferrite composition can have increased flexural strength.

The glass preferably contains about 25.0% by weight or less of $B_2O_3$ on the basis of the weight of the glass. In other words, the glass preferably contains about 7.8% by weight or less of B on the basis of the weight of the glass. When the composition of the glass is within the above range, the glass-ceramic-ferrite composition can have increased flexural strength.

The glass preferably contains about 70.0% by weight or more of $SiO_2$ on the basis of the weight of the glass. In other words, the glass preferably contains about 32.7% by weight or more of Si on the basis of the weight of the glass. When the composition of the glass is within the above range, the glass-ceramic-ferrite composition can have reduced porosity and increased flexural strength. The term "porosity" as used herein refers to the ratio of the sum of the cross-sectional areas of pores present in a specific region in a cross section of the composition to the area of the specific region. Details of a method for measuring the porosity are described below. As the porosity is higher, cracks originating from pores are more likely to occur and the flexural strength of the composition tends to be lower. Therefore, the strength (including flexural strength) of electronic components containing glass-ceramic-ferrite compositions with high porosity is likely to be low. Reducing the porosity of the glass-ceramic-ferrite composition enables the strength of electronic components to be increased.

The Ni—Zn—Cu ferrite, which is contained in the glass-ceramic-ferrite composition, is ferromagnetic ferrite which is a solid solution with a spinel structure. The Ni—Zn—Cu ferrite has sufficiently high relative permeability at high frequencies and is therefore suitable for high-frequency applications. The glass-ceramic-ferrite composition may contain the Ni—Zn—Cu ferrite only as ferrite or may contain, for example, one or more ferrites, such as Ni—Zn ferrite, Mn—Zn ferrite, Mg—Zn ferrite, and Ni—Co ferrite, other than the Ni—Zn—Cu ferrite in addition to the Ni—Zn—Cu ferrite.

The Ni—Zn—Cu ferrite accounts for about 58% to 64% by weight of the glass-ceramic-ferrite composition. The Ni—Zn—Cu ferrite has relative permeability higher than that of the glass. Therefore, when the glass-ceramic-ferrite composition contains about 58% by weight or more of the Ni—Zn—Cu ferrite, the glass-ceramic-ferrite composition can have high relative permeability. Furthermore, when the content of the Ni—Zn—Cu ferrite in the glass-ceramic-ferrite composition is about 58% by weight or more, the glass-ceramic-ferrite composition can have increased flexural strength. This is probably because when the content of the Ni—Zn—Cu ferrite therein is high, the bond between particles of the Ni—Zn—Cu ferrite in the composition is strong. On the other hand, the glass has a relative dielectric constant less than that of the Ni—Zn—Cu ferrite. Therefore, when the glass-ceramic-ferrite composition contains about 64% by weight or less of the Ni—Zn—Cu ferrite, the glass-ceramic-ferrite composition can have a low relative dielectric constant.

The content of the Ni—Zn—Cu ferrite in the glass-ceramic-ferrite composition is preferably about 50% by weight or less. When the content of the Ni—Zn—Cu ferrite therein is about 50% by weight or less, the composition can have a reduced relative dielectric constant and the relative dielectric constant of the composition can be adjusted to, for example, about 7 or less.

The content of the Ni—Zn—Cu ferrite in the glass-ceramic-ferrite composition is preferably 32% by weight or more. When the content of the Ni—Zn—Cu ferrite therein is about 32% by weight or more, the composition can have increased flexural strength.

The glass-ceramic-ferrite composition has a peak corresponding to the (511) plane of a magnetite phase in an X-ray diffraction pattern determined using a Cu Kα radiation. The peak originates from the (511) plane of a magnetite phase in the Ni—Zn—Cu ferrite, which is contained in the composition, and has a local maximum at a 2θ angle of about 57°. Herein, the local maximum need not be the global maximum of an X-ray diffraction pattern, that is, a peak having a local maximum need not be a peak (main peak) having a global maximum in an X-ray diffraction pattern. In the glass-ceramic-ferrite composition, the peak originating from the (511) plane of the magnetite phase has a full width at half maximum of about 0.38° to 0.56°. The inventor has found that the full width at half maximum of the peak originating from the (511) plane of the magnetite phase correlates with the rate of variation in relative permeability of the glass-ceramic-ferrite composition at high frequencies. In particular, when the full width at half maximum of the peak originating from the (511) plane of the magnetite phase is about 0.38° to 0.56° in an X-ray diffraction pattern determined using a Cu Kα radiation, a magnetic material has small variations (a small rate of variation) in relative permeability at high frequencies. As the full width at half maximum of a peak in an X-ray diffraction pattern is smaller, the crystallinity of ferrite tends to be higher. As the full width at half maximum thereof is larger, the crystallinity of ferrite tends to be lower and the number of defects or the amount of impurities tends to be larger. The glass-ceramic-ferrite composition has high crystallinity because the full width at half maximum is within the above range. As a result, the glass-ceramic-ferrite composition probably has small variations in magnetic characteristics such as relative permeability at a high frequency of several gigahertzes, for example, about 5 GHz. Electronic components containing the glass-ceramic-ferrite composition, which has small variations in magnetic characteristics at high frequencies, can reliably remove noise at high frequencies and have small variations in magnetic characteristics. The glass-ceramic-ferrite composition can be analyzed by X-ray diffraction in such a manner that the glass-ceramic-ferrite composition is ground into powder using a mortar or the like and the powder is analyzed with an X-ray diffractometer using a Cu Kα radiation.

In the glass-ceramic-ferrite composition, the ceramic filler contains quartz and, in some cases, forsterite.

The quartz has a coefficient of linear expansion greater than that of the glass. Therefore, adding the quartz allows the composition to have an increased coefficient of linear expansion. In the case of using the glass-ceramic-ferrite composition to form element bodies of electronic components, increasing the coefficient of linear expansion of the composition enables the occurrence of cracks in the electronic components to be suppressed when the electronic components are mounted on a board. A mechanism in which increasing the coefficient of linear expansion of the composition enables the occurrence of cracks to be suppressed is not restricted to any theory and is probably substantially as described below. When electronic components are mounted on a board, cracks occur in the electronic components in some cases. The occurrence of the cracks is probably due to the difference in stress between the electronic components and the board. In general, the board has a coefficient of linear expansion greater than that of the electronic components depending on materials making up the board and the electronic components. Increasing the coefficient of linear expansion of a composition used to form element bodies of the electronic components to a value close to the coefficient of linear expansion of the board enables the difference in stress between the electronic components and the board to be reduced. As a result, the thermal stress applied to the electronic components can be reduced when the electronic components are mounted on the board; hence, the occurrence of cracks in the electronic components can be suppressed.

The glass-ceramic-ferrite composition preferably has a coefficient of linear expansion of about 7.6 ppm/K to less than 8.2 ppm/K (i.e., from about 7.6 ppm/K to 8.2 ppm/K). When the coefficient of linear expansion thereof is about 7.6 ppm/K or more, the occurrence of cracks can be suppressed. When the coefficient of linear expansion thereof is less than about 8.2 ppm/K, the occurrence of cracks can be further suppressed.

Since the quartz has a low relative dielectric constant, adding the quartz enables the floating capacity of the glass-ceramic-ferrite composition to be reduced. Therefore, adding the quartz enables a composition suitable for high-frequency applications to be obtained.

The content of the quartz in the glass-ceramic-ferrite composition is about 4% to 13% by weight. When the content of the quartz therein is about 4% by weight or more, the occurrence of cracks can be suppressed and the floating capacity can be reduced. When the content of the quartz therein is about 13% by weight or less, sufficient flexural strength can be obtained and the floating capacity can be sufficiently reduced.

The ceramic filler, which is contained in the glass-ceramic-ferrite composition, may contain the forsterite, which is not essential. The forsterite is a ceramic material represented by the formula $2MgO.SiO_2$. When the glass-ceramic-ferrite composition contains the forsterite, the glass-ceramic-ferrite composition can have higher flexural strength.

A mechanism in which adding the forsterite increases the flexural strength of the composition is not restricted to any theory and is probably substantially as described below. The case where the glass-ceramic-ferrite composition contains the forsterite allows the surface of the composition to be smoother as compared to the case where the glass-ceramic-ferrite composition contains no forsterite. The surface of the composition can be checked by observation with, for example, an optical microscope and an electron microscope. When the surface of the composition is smooth, the number of stress-concentrated regions that can serve as origins of cracks when a load is applied to the composition is small. Therefore, the composition is unlikely to crack and can have high flexural strength.

The content of the forsterite in the glass-ceramic-ferrite composition is about 6% by weight or less. When the content of the forsterite therein is about 6% by weight or less, the composition can be sintered at a firing temperature of about 930° C. or less, at which co-firing with Ag is possible. The content of the forsterite in the glass-ceramic-ferrite composition is about 1% by weight or more. When the content of the forsterite therein is about 1% by weight or more, the glass-ceramic-ferrite composition can have reduced porosity and increased flexural strength.

The ceramic filler may contain alumina, willemite, cordierite, steatite, mullite, or the like in addition to the above-mentioned forsterite and quartz.

The sum of the contents of the Ni—Zn—Cu ferrite and ceramic filler in the glass-ceramic-ferrite composition is preferably about 80% by weight or less. When the sum of the contents of the Ni—Zn—Cu ferrite and ceramic filler therein is about 80% by weight or less, the glass-ceramic-ferrite composition contains about 20% by weight or more of the glass. As a result, the glass-ceramic-ferrite composition can have increased flexural strength. When the content of the glass in the composition is 20% by weight or more, the composition can have reduced sintering temperature and can be sintered at a firing temperature of about 930° C. or less, at which co-firing with Ag is possible. The sum of the contents of the Ni—Zn—Cu ferrite and ceramic filler in the glass-ceramic-ferrite composition is more preferably about 74% by weight or less. When the sum of the contents of the Ni—Zn—Cu ferrite and ceramic filler therein is about 74% by weight or less, the glass-ceramic-ferrite composition can have further increased flexural strength. The sum of the contents of the Ni—Zn—Cu ferrite and ceramic filler in the glass-ceramic-ferrite composition is preferably about 65% by weight or more. When the sum of the contents of the Ni—Zn—Cu ferrite and ceramic filler therein is about 65% by weight or more, the glass-ceramic-ferrite composition can have further increased flexural strength and reduced porosity. As a result, electronic components with high strength can be obtained.

The sum of the contents of the Ni—Zn—Cu ferrite and quartz in the glass-ceramic-ferrite composition is preferably about 65% by weight or more. The Ni—Zn—Cu ferrite and the quartz both have a coefficient of linear expansion greater than that of the glass. Therefore, when the sum of the contents of the Ni—Zn—Cu ferrite and quartz therein is about 65% by weight or more, the glass-ceramic-ferrite composition can have an increased coefficient of linear expansion. In the case of using the glass-ceramic-ferrite composition, which has a high coefficient of linear expansion, to form element bodies of electronic components, the thermal stress applied to the electronic components can be reduced when the electronic components are mounted on a board. As a result, the occurrence of cracks in the electronic components can be suppressed when the electronic components are mounted on the board. When the sum of the contents of the Ni—Zn—Cu ferrite and quartz therein is about 65% by weight or more, the glass-ceramic-ferrite composition can have reduced porosity and increased flexural strength.

The glass-ceramic-ferrite composition preferably has a porosity of about 7% or less. As the porosity of the glass-ceramic-ferrite composition is lower, the glass-ceramic-ferrite composition tends to have a more dense structure and increased flexural strength. When the porosity thereof is about 7% or less, the glass-ceramic-ferrite composition can have further increased flexural strength.

The glass-ceramic-ferrite composition may contain zirconia in addition to the above-mentioned glass, Ni—Zn—Cu ferrite, and ceramic filler.

The composition of the glass-ceramic-ferrite composition can be identified by a combination of, for example, inductively coupled plasma-atomic emission spectroscopy (ICP-AES) and X-ray diffractometry (XRD).

Method for Producing Glass-Ceramic-Ferrite Composition

A method for producing a glass-ceramic-ferrite composition according to an embodiment of the present disclosure is described below. The method includes preparing a mixture containing glass, a ceramic filler, and Ni—Zn—Cu ferrite and firing the mixture to obtain the glass-ceramic-ferrite composition. According to the method, the glass-ceramic-ferrite composition can be produced so as to have high flexural strength and a small rate of variation in relative permeability at a high frequency of several gigahertzes, for example, about 5 GHz.

In the method, the composition of the glass can be expressed with the content of each of $R_2O$, $Al_2O_3$, $B_2O_3$, and $SiO_2$ as described below. The glass contains about 0.5% by weight or more of $R_2O$, where R is at least one selected from the group consisting of Li, Na, and K; about 5.0% by weight or less of $Al_2O_3$; about 10.0% by weight or more of $B_2O_3$; and about 85.0% by weight or less of $SiO_2$ on the basis of the weight of the glass. Alternatively, the composition of the glass can be expressed with the content of each of R, Al, B, and Si as described below. The glass contains about 0.5% by weight or more of R in terms of $R_2O$, about 2.6% by weight or less of Al, about 3.1% by weight or more of B, and about 39.7% by weight or less of Si on the basis of the weight of the glass. When the composition of the glass is within the above range, the composition can be sintered at a firing temperature of about 930° C. or less, at which co-firing with Ag is possible.

The Ni—Zn—Cu ferrite contained in the glass-ceramic-ferrite composition may be ability the same as the Ni—Zn—Cu ferrite contained in the mixture. The content of the Ni—Zn—Cu ferrite in the mixture is about 58% to 64% by weight. When the content of the Ni—Zn—Cu ferrite therein is about 58% by weight or more, the composition can be obtained so as to have high relative permeability. When the content of the Ni—Zn—Cu ferrite therein is about 64% by weight or less, the composition can be obtained so as to have a low relative dielectric constant. The content of the Ni—Zn—Cu ferrite in the mixture is preferably about 50% by weight or less. When the content of the Ni—Zn—Cu ferrite therein is about 50% by weight or less, the composition can be obtained so as to have a lower relative dielectric constant. The content of the Ni—Zn—Cu ferrite in the mixture is preferably about 32% by weight or more. When the content of the Ni—Zn—Cu ferrite therein is about 32% by weight or more, the composition can be obtained so as to have higher flexural strength.

The ceramic filler contains the quartz and, in some cases, the forsterite. When the mixture contains the quartz, which is contained in the ceramic filler, the glass-ceramic-ferrite composition can be obtained so as to have a high coefficient of linear expansion and low floating capacity and so as to be suitable for high-frequency applications. The content of the quartz in the mixture is about 4% to 13% by weight. When the content of the quartz therein is about 4% by weight or more, the glass-ceramic-ferrite composition can be obtained such that the occurrence of cracks is suppressed and the floating capacity is reduced. When the content of the quartz therein is about 13% by weight or less, the glass-ceramic-ferrite composition can be obtained so as to have sufficient flexural strength and sufficiently reduced floating capacity.

The mixture may contain the forsterite, which is contained in the ceramic filler, in addition to the quartz. The forsterite is not essential. When the mixture contains the forsterite, the glass-ceramic-ferrite composition can be obtained so as to have high flexural strength. The content of the forsterite in the mixture is about 6% by weight or less. When the content of the forsterite therein is about 6% by weight or less, the mixture can be fired at a firing temperature of about 930° C. or less, at which co-firing with Ag is possible. The content of the forsterite in the mixture is preferably 1% by weight or more. When the content of the forsterite therein is 1% by weight or more, the glass-ceramic-ferrite composition can be obtained so as to have low porosity and high flexural strength.

The ceramic filler may contain alumina, willemite, cordierite, steatite, mullite, or the like in addition to the above-mentioned forsterite and quartz.

The sum of the contents of the Ni—Zn—Cu ferrite and ceramic filler in the mixture is preferably about 80% by weight or less. When the sum of the contents of the Ni—Zn—Cu ferrite and ceramic filler therein is about 80% by weight or less, the mixture contains about 20% by weight or more of the glass. In this case, the mixture can have reduced sintering temperature and can be fired at a temperature of about 930° C. or less, at which co-firing with Ag is possible. The sum of the contents of the Ni—Zn—Cu ferrite and ceramic filler in the mixture is more preferably about 74% by weight or less. When the sum of the contents of the Ni—Zn—Cu ferrite and ceramic filler therein is about 74% by weight or less, the glass-ceramic-ferrite composition can be obtained so as to have higher flexural strength. The sum of the contents of the Ni—Zn—Cu ferrite and ceramic filler in the mixture is preferably about 65% by weight or more. When the sum of the contents of the Ni—Zn—Cu ferrite and ceramic filler therein is about 65% by weight or more, the glass-ceramic-ferrite composition can have be obtained so as to have higher flexural strength and lower porosity.

The mixture may be contained in paste or slurry. The paste or the slurry may contain a solvent such as toluene or ethanol, a binder such as an acrylic compound or polyvinyl butyral, or a plasticizer such as dioctyl phthalate in addition to the mixture (that is, the above-mentioned glass, Ni—Zn—Cu ferrite, and ceramic filler).

The composition of the mixture may be considered to be substantially the same as the composition of the glass-ceramic-ferrite composition, which is obtained using the mixture.

The mixture is prepared by a procedure below so as to contain the glass, the Ni—Zn—Cu ferrite, and the ceramic filler in the above-mentioned proportions. First, oxides or carbonates, that is, starting materials for the glass are prepared so as to give the above glass composition and are put in a Pt crucible. The starting materials are melted in the Pt crucible, whereby a glass melt is obtained. The melting temperature melting time of the starting materials can be appropriately set depending on the glass composition. The starting materials may be melted at a temperature of, for example, about 1,400° C. to 1,600° C. for about 3 hours. The glass melt is quenched, followed by grinding, whereby a glass powder is obtained. The obtained glass powder, a forsterite powder and/or quartz powder serving as a ceramic filler, and a Ni—Zn—Cu ferrite powder are mixed at a predetermined ratio, whereby the mixture can be prepared so as to contain the glass, the Ni—Zn—Cu ferrite, and the ceramic filler.

Next, the mixture is fired, whereby the glass-ceramic-ferrite composition is obtained. The mixture is preferably fired at a temperature of about 880° C. to 920° C. When the firing temperature of the mixture is about 880° C. to 920° C., the Ni—Zn—Cu ferrite can have high crystallinity and the glass-ceramic-ferrite composition can be obtained so as to have a small rate of variation in relative permeability at high frequencies. The mixture is more preferably fired at a temperature of about 890° C. to 910° C. Setting the firing temperature of the mixture to such a range allows the glass-ceramic-ferrite composition to have a smaller rate of variation in relative permeability at high frequencies. Incidentally, since the mixture is fired at a temperature of about 920° C. or less as described above, the mixture can be co-fired with Ag.

In the case of firing the mixture, slurry or paste prepared by mixing the mixture with the above-mentioned solvent, binder, plasticizer, and the like may be fired. A firing atmosphere is not particularly limited. In the case of co-firing the mixture with an inner conductor containing, for example, an unoxidizable material such as Ag, the mixture may be fired in an air atmosphere. In the case of co-firing the mixture with an inner conductor containing an oxidizable material such as Cu, the mixture is preferably fired in a low-oxygen atmosphere such as a nitrogen atmosphere.

Whether the glass-ceramic-ferrite composition obtained by the above procedure is sintered can be confirmed by techniques below.

In a technique, sintering can be confirmed by measuring the water content of the glass-ceramic-ferrite composition. In particular, the weight of a sample is measured before and after immersion in water and the water content is calculated by dividing the increase in weight of the sample immersed in water by the weight of the sample not immersed in water. When the water content is about 0.5% or more, the composition is judged to be not sintered. When the water content is less than about 0.5%, the composition is judged to be sintered.

In another technique, after being immersed in an oily ink (for example, a red ink), the glass-ceramic-ferrite composition is washed with water. The washed composition is visually observed. When the color of the oily ink remains, the composition is judged to be not sintered. When the color of the oily ink does not remain, the composition is judged to be sintered.

The glass-ceramic-ferrite composition, which is produced by the method, has high flexural strength and can suppress the occurrence of cracks. Furthermore, the glass-ceramic-ferrite composition, which is produced by the method, has a peak corresponding to the (511) plane of a magnetite phase in an X-ray diffraction pattern determined using a Cu Kα radiation and the full width at half maximum of the peak is about 0.38° to 0.56°. Since the full width at half maximum thereof is within the above range, variations (the rate of variation) in relative permeability of the glass-ceramic-ferrite composition at high frequencies are small. The glass-ceramic-ferrite composition can be analyzed by X-ray diffraction in the above-mentioned manner.

Electronic Component

An electronic component according to an embodiment of the present disclosure is described below. The electronic component includes an element body containing the above-mentioned glass-ceramic-ferrite composition and an inner conductor placed in the element body. The electronic component has high flexural strength and small variations in magnetic characteristics at a high frequency of several gigahertzes, for example, about 5 GHz.

The inner conductor may contain a conductive material such as Ag, Cu, Pt, Pd, or Au. The inner conductor may contain one type of conductive material only or two or more types of conductive materials. In particular, Ag has low conductor resistance; hence, the inner conductor preferably contains Ag.

The electronic component is not particularly limited and may be, for example, such a multilayer coil component as shown in the FIGURE.

The FIGURE is a schematic sectional view of an example of a multilayer coil component 10. As shown in the FIGURE, the multilayer coil component 10 includes an element body 11 containing the glass-ceramic-ferrite composition, an inner conductor 12 placed in the element body 11, and outer electrodes 13 and 14 placed on outer surfaces of the element body 11. The inner conductor 12 is a coil component extending like a coil. The inner conductor 12 has an end portion electrically connected to the outer electrode 13 and another end portion electrically connected to the outer electrode 14.

Since the electronic component includes the element body 11, which contains the glass-ceramic-ferrite composition having high flexural strength and a small rate of variation in relative permeability at high frequencies, the electronic component is unlikely to crack during mounting, has small variations in magnetic characteristics at high frequencies, and is therefore suitable for high-frequency applications.

Method for Manufacturing Electronic Component

A method for manufacturing an electronic component according to an embodiment of the present disclosure is described below. The electronic component includes an element body containing a glass-ceramic-ferrite composition and an inner conductor placed in the element body. The method includes preparing a mixture containing glass, a ceramic filler, and Ni—Zn—Cu ferrite; forming the mixture into sheets; forming a conductive pattern on the sheets using a conductive paste; stacking the sheets provided with the conductive pattern to form a multilayer body; and firing the multilayer body to obtain the electronic component, which includes the element body containing the glass-ceramic-ferrite composition and the inner conductor placed in the element body. According to the method, the electronic component can be manufactured so as to have high flexural strength and small variations in magnetic characteristics at a high frequency of several gigahertzes, for example, about 5 GHz.

The mixture may be substantially the same as the mixture used in the method for producing the above-mentioned glass-ceramic-ferrite composition. In descriptions below, items common to the above-mentioned components of the mixture used in the method for producing the glass-ceramic-ferrite composition are not described in detail in some cases. In particular, similar effects due to similar components are not are not mentioned one by one in descriptions below. Effects similar to those due to the above-mentioned components shall be provided unless otherwise specified.

The composition of the glass can be expressed with the content of each of $R_2O$, $Al_2O_3$, $B_2O_3$, and $SiO_2$ as described below. The glass contains about 0.5% by weight or more of $R_2O$, where R is at least one selected from the group consisting of Li, Na, and K; about 5.0% by weight or less of $Al_2O_3$; about 10.0% by weight or more of $B_2O_3$; and about 85.0% by weight or less of $SiO_2$ on the basis of the weight of the glass. Alternatively, the composition of the glass can be expressed with the content of each of R, Al, B, and Si as described below. The glass contains about 0.5% by weight or more of R in terms of $R_2O$, about 2.6% by weight or less of Al, about 3.1% by weight or more of B, and about 39.7% by weight or less of Si on the basis of the weight of the glass. When the composition of the glass is within the above range, the composition can be sintered at a firing temperature of about 930° C. or less, at which co-firing with Ag is possible.

The content of the Ni—Zn—Cu ferrite in the mixture is about 58% to 64% by weight. When the content of the Ni—Zn—Cu ferrite therein is about 58% by weight or more, the element body can be obtained so as to have high relative permeability. When the content of the Ni—Zn—Cu ferrite therein is about 64% by weight or less, the element body can be obtained so as to have a low relative dielectric constant.

The ceramic filler contains quartz and, in some cases, forsterite. When the mixture contains the quartz, which is contained in the ceramic filler, the element body can be obtained so as to have a high coefficient of linear expansion and is suitable for high-frequency applications. The content of the quartz in the glass-ceramic-ferrite composition is about 4% to 13% by weight. When the content of the quartz therein is about 4% by weight or more, the element body can be obtained such that the occurrence of cracks is suppressed and the floating capacity is reduced. When the content of the quartz therein is about 13% by weight or less, the element body can be obtained so as to have sufficient flexural strength and sufficiently reduced floating capacity.

The mixture may contain the forsterite, which is contained in the ceramic filler, in addition to the quartz. The forsterite is not essential. When the mixture contains the forsterite, the element body can be obtained so as to have high flexural strength. The content of the forsterite in the mixture is about 6% by weight or less. When the content of the forsterite therein is about 6% by weight or less, the mixture can be fired at a firing temperature of about 930° C. or less, at which co-firing with Ag is possible. The content of the forsterite in the mixture is preferably 1% by weight or more. When the content of the forsterite therein is 1% by weight or more, the element body can be obtained so as to have low porosity and high flexural strength.

The sum of the contents of the Ni—Zn—Cu ferrite and ceramic filler in the mixture is preferably about 80% by weight or less. When the sum of the contents of the Ni—Zn—Cu ferrite and ceramic filler therein is about 80% by weight or less, the mixture contains about 20% by weight or more of the glass. In this case, the mixture can have reduced sintering temperature and can be sintered at a firing temperature of about 930° C. or less, at which co-firing with Ag is possible.

The mixture may be contained in paste or slurry. The paste or the slurry may contain a solvent such as toluene or ethanol, a binder such as an acrylic compound or polyvinyl butyral, or a plasticizer such as dioctyl phthalate in addition to the mixture (that is, the above-mentioned glass, Ni—Zn—Cu ferrite, and ceramic filler).

The composition of the mixture may be considered to be substantially the same as the composition of the element body, which is obtained using the mixture.

The mixture is prepared by a procedure below so as to contain the glass, the Ni—Zn—Cu ferrite, and the ceramic filler in the above-mentioned proportions. First, oxides or carbonates, that is, starting materials for the glass are prepared so as to give the above glass composition and are put in a Pt crucible. The starting materials are melted in the Pt crucible, whereby a glass melt is obtained. The melting temperature melting time of the starting materials can be appropriately set depending on the glass composition. The starting materials may be melted at a temperature of, for example, about 1,400° C. to 1,600° C. for about 3 hours. The glass melt is quenched, followed by grinding, whereby a glass powder is obtained. The obtained glass powder, a forsterite powder and/or quartz powder serving as a ceramic filler, and a Ni—Zn—Cu ferrite powder are mixed at a predetermined ratio, whereby the mixture can be prepared so as to contain the glass, the Ni—Zn—Cu ferrite, and the ceramic filler.

Next, the mixture is formed into sheets. In the case of forming the mixture, slurry or paste is prepared by mixing the mixture with the above-mentioned solvent, binder, plasticizer, and the like and may be formed into the sheets. A process for forming the sheets is not particularly limited. The sheets can be formed by a doctor blade process or the like.

Next, the conductive pattern is formed on the sheets using the conductive paste.

The conductive paste may contain a powder of a metal such as Ag, Cu, Pt, Pd, or Au. The conductive paste may contain one type of metal powder only or two or more types of metal powders. In particular, Ag has low conductor resistance; hence, the conductive paste preferably contains Ag. The conductive paste may contain an organic binder and a solvent in addition to the metal powder. The conductive paste may further contain various additives such as a dispersant. The conductive pattern can be formed in such a manner that the conductive paste is applied to the sheets by a screen printing process or a similar process so as to form a predetermined pattern.

A predetermined number of the sheets provided with the conductive pattern are stacked, whereby the multilayer body is formed. In the case of manufacturing, for example, such a multilayer coil component as shown in the FIGURE, the multilayer body can be obtained in such a manner that a predetermined number of the sheets provided with the conductive pattern are stacked and are then sandwiched between sheets provided with no conductive pattern.

The obtained multilayer body is fired, whereby the electronic component, which includes the element body containing the glass-ceramic-ferrite composition and the inner conductor placed in the element body, is obtained. The multilayer body is preferably fired at a temperature of about 880° C. to 920° C. When the firing temperature of the multilayer body is about 880° C. to 920° C., the Ni—Zn—Cu ferrite can have high crystallinity and the electronic component can be obtained so as to have a small rate of variation in relative permeability at high frequencies. The multilayer body is more preferably fired at a temperature of about 890° C. to 910° C. Setting the firing temperature of the multilayer body to such a range allows the electronic component to have a smaller rate of variation in relative permeability at high frequencies. Incidentally, since the multilayer body is fired at a temperature of about 920° C. or less as described above, the multilayer body can be co-fired with Ag.

A firing atmosphere is not particularly limited. When the conductive pattern contains, for example, an unoxidizable material such as Ag, the multilayer body may be fired in an air atmosphere. When the conductive pattern contains an oxidizable material such as Cu, the multilayer body is preferably fired in a low-oxygen atmosphere such as a nitrogen atmosphere.

Whether the electronic component obtained in this manner is sintered can be confirmed by the above-mentioned technique.

Furthermore, outer electrodes and the like may be appropriately formed on the obtained electronic component.

The electronic component, which is manufactured by the method, is unlikely to crack during mounting and has high reliability because the element body has high flexural strength. Furthermore, the electronic component, which is manufactured by the method, has a peak corresponding to the (511) plane of a magnetite phase in an X-ray diffraction pattern determined using a Cu Kα radiation and the full width at half maximum of the peak is about 0.38° to 0.56°. The peak originates from the (511) plane of a magnetite phase in the Ni—Zn—Cu ferrite contained in the element body of the electronic component and has a local maximum at a 2θ angle of about 57°. Since the full width at half maximum of the peak is within the above range, variations (the rate of variation) in relative permeability of the element body at high frequencies are small. The electronic component, which is manufactured by the method, can reliably remove noise at high frequencies because variations in relative permeability of the element body at high frequencies are small. According to the method, the electronic component can be manufactured so as to have small variations in relative permeability at high frequencies and so as to be suitable for high-frequency applications. The electronic component can be analyzed by X-ray diffraction in such a manner that the electronic component is ground into powder using a mortar or the like and the powder is analyzed with an X-ray diffractometer using a Cu Kα radiation.

EXAMPLES

Examples 1 to 32

Preparation of Mixtures

Oxides or carbonates, that is, starting materials for glass were prepared so as to give a glass composition shown in Table 1 and were put in a Pt crucible. The starting materials were melted in the Pt crucible at a temperature of about 1,400° C. to 1,600° C. for about 3 hours depending on the glass composition, whereby glass melts were obtained. The glass melts were quenched, followed by grinding, whereby glass powders according to Examples 1 to 32 were obtained. The obtained glass powders, a forsterite powder and/or quartz powder serving as a ceramic filler, and a Ni—Zn—Cu ferrite powder are mixed at a ratio shown in Table 1, whereby mixtures, according to Examples 1 to 32, containing glass, Ni—Zn—Cu ferrite, and a ceramic filler were prepared. Each mixture was sufficiently mixed with a solvent, a binder, and a plasticizer.

Preparation of Sheets

The above mixtures were formed into sheets according to Examples 1 to 32 by a doctor blade process. Samples below were prepared using the sheets and were measured for characteristics. Before the characteristics were measured, whether the samples were sintered was confirmed by a technique below. After being immersed in an oily ink (for example, a red ink), the samples were washed with water. The washed samples were visually observed. When the color of the oily ink remained, the samples were judged to be not sintered. When the color of the oily ink did not remain, the samples were judged to be sintered. Samples that were not sintered were indicated with the term "unsintered" in Table 2 and were not measured for characteristics.

X-Ray Diffraction Analysis

The above sheets were cut to a predetermined size and a predetermined number of the cut sheets were stacked, whereby multilayer bodies were obtained. The multilayer bodies were fired at about 900° C. under a low-oxygen atmosphere, whereby samples, according to Examples 1 to 32, having a size of about 10 mm×about 4 mm×about 0.8 mm were prepared. The obtained samples were ground into powder using a mortar. The powders were analyzed by X-ray diffraction with an X-ray diffractometer available from Rigaku Corporation using a Cu Kα radiation. The full width at half maximum of a peak, observed at a 2θ angle of about 57°, corresponding to the (511) plane of a magnetite phase was determined from each obtained X-ray diffraction pattern. The analysis results are shown in Table 2.

Measurement of Relative Dielectric Constant

The above sheets were cut to a predetermined size. An electrode paste containing Ag was applied to surfaces of the cut sheets, whereby an Ag electrode pattern was formed thereon. Multilayer bodies each including a predetermined number of stacked sheets provided with no Ag electrode pattern and the sheets, provided with the Ag electrode pattern, placed on the upper and lower surfaces thereof were fired at about 900° C. under a low-oxygen atmosphere, whereby single-plate capacitors, according to Examples 1 to 32, having a size of about 6 mm×about 6 mm×about 0.4 mm were prepared. The obtained single-plate capacitors were measured for electrostatic capacity using an LCR meter, HP4284A, available from Keysight Technologies Inc. The relative dielectric constant was calculated on the basis of the measured electrostatic capacity, electrode area, and interelectrode distance. The results are shown in Table 2.

Measurement of Relative Permeability

The above sheets were cut to a predetermined size. A predetermined number of the cut sheets were stacked and were then punched into substantially ring-shaped multilayer bodies. The multilayer bodies were fired at about 900° C. under a low-oxygen atmosphere, whereby samples, according to Examples 1 to 32, having a diameter of about 16 mm and a thickness of about 0.8 mm were prepared. The obtained samples, which were substantially ring-shaped, were measured for relative permeability using an impedance analyzer, 4991A, available from Keysight Technologies Inc. Measurement conditions were set to a measurement frequency of about 10 MHz and a measurement temperature of about 20° C. The results are shown in Table 2. The relative permeability of 20 samples was measured, followed by calculating the average and the standard deviation. The value obtained by multiplying the value obtained by dividing the standard deviation by the average by 3 was defined as the coefficient of variation of relative permeability. The coefficient of variation of the relative permeability determined at about 10 MHz is used as an indicator for the coefficient of variation of relative permeability at high frequencies. As the coefficient of variation of relative permeability is larger, the rate of variation in relative permeability at high frequencies is larger. The calculated coefficient of variation of relative permeability is shown in Table 2.

Measurement of Porosity

The above sheets were cut to a predetermined size and a predetermined number of the cut sheets were stacked, whereby multilayer bodies were obtained. The multilayer bodies were fired at about 900° C. under a low-oxygen atmosphere, whereby samples, according to Examples 1 to 32, having a size of about 10 mm×about 4 mm×about 0.8 mm were prepared. Each obtained sample was polished close to the center thereof, whereby a cross section was exposed. The cross section was observed with a digital microscope available from Keyence Corporation at about 2,000× magnification, followed by determining the cross-sectional area of each of all pores present in a field of view. The sum of the cross-sectional areas of obtained pores was defined as the cross-sectional area of the whole of the pores in the field of view and the ratio of the cross-sectional area of the whole of the pores in the field of view to the area of the whole field of view was calculated as the porosity of the sample. In particular, binarization was performed in such a manner that a certain brightness was set to a threshold using the fact that, in the field of view, the pores were different in brightness from a portion other than the pores, whereby image processing was performed such that the pores were black and the portion other than the pores was white. Thereafter, the area of black portions was calculated as the cross-sectional area of the whole of the pores and the ratio of the cross-sectional area of the whole of the pores to the area of the whole field of view was calculated as the porosity. The results are shown in Table 2. Incidentally, the above calculation technique is an example and the cross-sectional area of pores may be determined by another known technique. In the examples, the porosity was calculated using a cross section of the vicinity of the center as described above. Even in the case of using a cross section of any portion of a multilayer body, the calculated porosity may be considered to be substantially the same. In the examples, the cross section was observed at about 2,000× magnification. A cross section may be observed at about 1,000× to 10,000× magnification.

Measurement of Flexural Strength

The above sheets were cut to a predetermined size and a predetermined number of the cut sheets were stacked, whereby multilayer bodies were obtained. The multilayer bodies were fired at about 900° C. under a low-oxygen atmosphere, whereby samples, according to Examples 1 to 32, having a size of about 30 mm×about 4 mm×about 0.8 mm were prepared. The obtained samples were measured for flexural strength by a three-point bending test in accordance with JIS R 1601, whereby the flexural strength thereof was determined. Autograph available from Shimadzu Corporation was used to measure the flexural strength. The results are shown in Table 2.

Measurement of Coefficient of Linear Expansion

The above sheets were cut to a predetermined size and a predetermined number of the cut sheets were stacked, whereby multilayer bodies were obtained. The multilayer bodies were fired at about 900° C. under a low-oxygen atmosphere, whereby samples, according to Examples 1 to 32, having a size of about 10 mm×about 4 mm×about 0.8 mm were prepared. The obtained samples were measured for coefficient of linear expansion using DILATOmeter available from Netsch GmbH, whereby the coefficient of linear expansion thereof was determined. The results are shown in Table 2. Incidentally, in Tables 1 and 2, those asterisked are comparative examples.

TABLE 1

| Example | Glass Raw material composition | | | | Amount | Filler | | Ferrite | Ferrite plus ferrite (weight percent) |
|---|---|---|---|---|---|---|---|---|---|
| | $K_2O$ | $Al_2O_3$ | $B_2O_3$ | $SiO_2$ | | Forsterite | Quartz | | |
| *1 | 0.2 | 0 | 20 | 79.8 | 28 | 3 | 8 | 61 | 72 |
| 2 | 0.5 | 0 | 20 | 79.5 | 28 | 3 | 8 | 61 | 72 |
| 3 | 5 | 0 | 20 | 75 | 28 | 3 | 8 | 61 | 72 |
| 4 | 5.5 | 0 | 20 | 74.5 | 28 | 3 | 8 | 61 | 72 |
| 5 | 2 | 0 | 20 | 78 | 28 | 3 | 8 | 61 | 72 |
| 6 | 2 | 5 | 20 | 73 | 28 | 3 | 8 | 61 | 72 |
| *7 | 2 | 10 | 15 | 73 | 28 | 3 | 8 | 61 | 72 |
| *8 | 3 | 4 | 8 | 85 | 28 | 3 | 8 | 61 | 72 |
| 9 | 2 | 3 | 10 | 85 | 28 | 3 | 8 | 61 | 72 |
| 10 | 2 | 0 | 25 | 73 | 28 | 3 | 8 | 61 | 72 |
| 11 | 2 | 0 | 28 | 70 | 28 | 3 | 8 | 61 | 72 |
| 12 | 4 | 3 | 25 | 68 | 28 | 3 | 8 | 61 | 72 |
| 13 | 3 | 2 | 25 | 70 | 28 | 3 | 8 | 61 | 72 |
| 14 | 2 | 0 | 13 | 85 | 28 | 3 | 8 | 61 | 72 |
| *15 | 2 | 0 | 10 | 88 | 28 | 3 | 8 | 61 | 72 |
| *16 | 2 | 0 | 20 | 78 | 26 | 7 | 8 | 59 | 74 |
| 17 | 2 | 0 | 20 | 78 | 26 | 6 | 8 | 60 | 74 |
| 18 | 2 | 0 | 20 | 78 | 30 | 1 | 7 | 62 | 70 |
| 19 | 2 | 0 | 20 | 78 | 31 | 0 | 7 | 62 | 69 |
| 20 | 2 | 0 | 20 | 78 | 28 | 3 | 8 | 61 | 72 |
| *21 | 2 | 0 | 20 | 78 | 25 | 3 | 7 | 65 | 75 |
| 22 | 2 | 0 | 20 | 78 | 26 | 3 | 7 | 64 | 74 |
| *23 | 2 | 0 | 20 | 78 | 26 | 6 | 3 | 65 | 74 |
| 24 | 2 | 0 | 20 | 78 | 30 | 4 | 4 | 62 | 70 |
| 25 | 2 | 0 | 20 | 78 | 30 | 3 | 9 | 58 | 70 |
| *26 | 2 | 0 | 20 | 78 | 33 | 3 | 7 | 57 | 67 |
| *27 | 2 | 0 | 20 | 78 | 26 | 2 | 14 | 58 | 74 |
| 28 | 2 | 0 | 20 | 78 | 26 | 2 | 13 | 59 | 74 |
| 29 | 2 | 0 | 20 | 78 | 36 | 1 | 4 | 59 | 64 |
| 30 | 2 | 0 | 20 | 78 | 35 | 1 | 4 | 60 | 65 |
| 31 | 2 | 0 | 20 | 78 | 20 | 3 | 13 | 64 | 80 |
| 32 | 2 | 0 | 20 | 78 | 19 | 4 | 13 | 64 | 81 |

TABLE 2

| Example | Full width at half maximum of X-ray diffraction peak (°) | Relative dielectric constant | Relative permeability | Coefficient of variation of relative permeability (%) | Porosity (%) | Flexural strength (Mpa) | Coefficient of linear expansion (ppm/K) |
|---|---|---|---|---|---|---|---|
| *1 | Unsintered | Unsintered | Unsintered | Unsintered | Unsintered | Unsintered | Unsintered |
| 2 | 0.53 | 5.62 | 3.77 | 3.5 | 1.8 | 220 | 7.9 |
| 3 | 0.52 | 5.64 | 3.79 | 3.9 | 2.1 | 221 | 7.9 |
| 4 | 0.56 | 5.44 | 3.48 | 4.5 | 3.2 | 170 | 7.8 |
| 5 | 0.4 | 6.01 | 4.23 | 3.3 | 1.5 | 227 | 8 |
| 6 | 0.55 | 5.63 | 3.86 | 4.2 | 3.4 | 228 | 7.8 |
| *7 | Unsintered | Unsintered | Unsintered | Unsintered | Unsintered | Unsintered | Unsintered |
| *8 | Unsintered | Unsintered | Unsintered | Unsintered | Unsintered | Unsintered | Unsintered |
| 9 | 0.55 | 5.66 | 3.91 | 4.8 | 3 | 227 | 7.9 |
| 10 | 0.48 | 5.91 | 4.08 | 4.8 | 2.2 | 226 | 7.8 |
| 11 | 0.48 | 5.69 | 3.89 | 7.8 | 4.8 | 168 | 7.8 |
| 12 | 0.56 | 5.19 | 3.79 | 8 | 6.4 | 162 | 7.7 |
| 13 | 0.52 | 5.68 | 3.87 | 4.2 | 3.8 | 228 | 7.9 |
| 14 | 0.5 | 5.7 | 3.88 | 4.4 | 2.8 | 226 | 7.8 |
| *15 | Unsintered | Unsintered | Unsintered | Unsintered | Unsintered | Unsintered | Unsintered |

TABLE 2-continued

| Example | Full width at half maximum of X-ray diffraction peak (°) | Relative dielectric constant | Relative permeability | Coefficient of variation of relative permeability (%) | Porosity (%) | Flexural strength (Mpa) | Coefficient of linear expansion (ppm/K) |
|---|---|---|---|---|---|---|---|
| *16 | Unsintered | Unsintered | Unsintered | Unsintered | Unsintered | Unsintered | Unsintered |
| 17 | 0.53 | 5.62 | 3.88 | 4.9 | 6.7 | 226 | 8 |
| 18 | 0.42 | 5.98 | 4.25 | 3.3 | 6.8 | 225 | 8 |
| 19 | 0.42 | 5.92 | 4.21 | 5.9 | 8.2 | 161 | 7.7 |
| 20 | 0.45 | 5.86 | 4.05 | 2.9 | 1.6 | 222 | 7.9 |
| *21 | 0.37 | 6.14 | 4.36 | 10.7 | 4.1 | 214 | 8 |
| 22 | 0.38 | 6.09 | 4.24 | 8.1 | 3.7 | 232 | 8 |
| *23 | 0.36 | 6.14 | 4.27 | 11.2 | 2.8 | 207 | 7.9 |
| 24 | 0.38 | 6.09 | 4.23 | 8.9 | 4.4 | 226 | 7.9 |
| 25 | 0.56 | 5.63 | 3.88 | 7.9 | 2.3 | 211 | 7.8 |
| *26 | 0.57 | 5.56 | 3.68 | 10.2 | 2.5 | 202 | 7.8 |
| *27 | 0.58 | 5.64 | 3.83 | 9.1 | 4.8 | 161 | 7.7 |
| 28 | 0.55 | 5.62 | 3.87 | 7.1 | 5.2 | 220 | 7.7 |
| 29 | 0.56 | 5.57 | 3.79 | 8.8 | 8.3 | 170 | 7.8 |
| 30 | 0.51 | 5.57 | 3.81 | 6.9 | 6.8 | 178 | 7.8 |
| 31 | 0.52 | 5.77 | 4.16 | 7 | 3.2 | 180 | 8 |
| 32 | 0.39 | 5.79 | 4.25 | 8.8 | 3.1 | 176 | 8.1 |

As shown in Table 2, the samples according to Examples 2 to 6, 9 to 14, 17 to 20, 22, 24, 25, and 28 to 32 had a low coefficient of variation of relative permeability of about 8.9% or less. However, the samples according to Examples 1, 7, 8, 15, 16, 21, 23, 26, and 27 had a high coefficient of variation of relative permeability of about 9.1% or more. Furthermore, as shown in Table 2, the samples according to Examples 2, 3, 5, 6, 9, 10, 13, 14, 17, 18, 20, 22, 24, 25, and 28 had a low relative dielectric constant of less than about 7, a low relative permeability of less than about 7, a coefficient of variation of relative permeability of less than about 9%, a porosity of less than about 7%, a high flexural strength of about 190 MPa or more, and a coefficient of linear expansion of about 7.6 ppm/K to less than about 8.2 ppm/K (i.e., from about 7.6 ppm/K to 8.2 ppm/K) in an appropriate range.

Furthermore, the samples, in which the sum of the weight of the Ni—Zn—Cu ferrite and the weight of the ceramic filler was more than about 70% by weight to less than about 74% by weight, according to Examples 2, 3, 5, 6, 9, 10, 13, 14, 17, 18, 20, 22, 24, 25, and 28 exhibited a trend toward higher flexural strength. On the other hand, the following samples were not sintered at a sintering temperature of about 900° C.; the sample, which contained less than about 0.5% by weight of $K_2O$ on the basis of the weight of the glass, according to Example 1; the sample, which contained more than about 5.0% by weight of $Al_2O_3$ on the basis of the weight of the glass, according to Example 7; the sample, which contained less than about 10.0% by weight of $B_2O_3$ on the basis of the weight of the glass, according to Example 8; the sample, which contained more than about 85.0% by weight of $SiO_2$ on the basis of the weight of the glass, according to Example 15; and the sample, which had a forsterite content of more than about 6% by weight, according to Example 16.

The following samples had a flexural strength of less than about 190 MPa: the sample, which contained more than about 5.0% by weight of $K_2O$ on the basis of the weight of the glass, according to Example 4; the sample, which contained more than about 25.0% by weight of $B_2O_3$ on the basis of the weight of the glass, according to Example 11; the sample, which contained less than about 70.0% by weight of $SiO_2$ on the basis of the weight of the glass, according to Example 12; the sample, which contained no forsterite, according to Example 19; and the sample, which had a quartz content of more than about 13% by weight, according to Example 27. The sample, in which the sum of the weight of the Ni—Zn—Cu ferrite and the weight of the ceramic filler was more than about 80% by weight, according to Example 32 had a flexural strength of less than about 190 MPa. Furthermore, the samples, in which the sum of the weight of the Ni—Zn—Cu ferrite and the weight of the ceramic filler was more than about 74% by weight, according to Examples 31 and 32 had a flexural strength lower than that of the sample, in which the sum of the weight of the Ni—Zn—Cu ferrite and the weight of the ceramic filler was about 74% by weight or less, according to Example 28.

The following samples had a porosity of more than about 7% and a flexural strength of less than about 190 MPa: the sample, which contained no forsterite, according to Example 19; the sample, which contained less than about 70.0% by weight of $SiO_2$ on the basis of the weight of the glass, according to Example 12; and the sample, in which the sum of the weight of the Ni—Zn—Cu ferrite and the weight of the ceramic filler was less than about 64% by weight, according to Example 29.

As is clear from the test results shown in Table 2, the samples having a porosity of more than about 7% had a flexural strength of less than about 190 MPa.

The following samples had a peak having a local maximum at a 2θ angle of about 57° and a full width at half maximum outside the range of about 0.38° to 0.56° and had a coefficient of variation of relative permeability of more than about 10%: the sample, which had a Ni—Zn—Cu ferrite content of more than about 64% by weight, according to Example 21; the sample, which had a quartz content of less than about 4% by weight, according to Example 23; and the sample, which had a Ni—Zn—Cu ferrite content of less than about 58% by weight, according to Example 26.

A glass-ceramic-ferrite composition according to the present disclosure can be preferably used for electronic components for high-frequency applications.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A glass-ceramic-ferrite composition containing:
   glass;
   a ceramic filler; and
   Ni—Zn—Cu ferrite, the glass-ceramic-ferrite composition having a peak corresponding to the (511) plane of a magnetite phase in an X-ray diffraction pattern determined using a Cu Kα radiation, the full width at half maximum of the peak being about 0.38° to 0.56°,
   wherein the glass contains about 0.5% by weight or more of $R_2O$, where R is at least one selected from the group consisting of Li, Na, and K; about 5.0% by weight or less of $Al_2O_3$; about 10.0% by weight or more of $B_2O_3$; and about 85.0% by weight or less of $SiO_2$ on the basis of the weight of the glass, the Ni—Zn—Cu ferrite accounts for about 58% to 64% by weight of the glass-ceramic-ferrite composition, the ceramic filler contains quartz and, in some cases, forsterite, the quartz accounts for about 4% to 13% by weight of the glass-ceramic-ferrite composition, and the forsterite accounts for about 6% by weight or less of the glass-ceramic-ferrite composition.

2. The glass-ceramic-ferrite composition according to claim 1, wherein the glass contains about 5.0% by weight or less of $R_2O$ on the basis of the weight of the glass.

3. The glass-ceramic-ferrite composition according to claim 1, wherein the glass contains about 25.0% by weight or less of $B_2O_3$ on the basis of the weight of the glass.

4. The glass-ceramic-ferrite composition according to claim 1, wherein the glass contains about 70.0% by weight or more of $SiO_2$ on the basis of the weight of the glass.

5. A glass-ceramic-ferrite composition containing: glass;
   a ceramic filler; and
   Ni—Zn—Cu ferrite, the glass-ceramic-ferrite composition having a peak corresponding to the (511) plane of a magnetite phase in an X-ray diffraction pattern determined using a Cu Kα radiation, the full width at half maximum of the peak being about 0.38° to 0.56°,
   wherein the glass is borosilicate glass containing R, where R is at least one selected from the group consisting of Li, Na, and K, and, in some cases, Al and contains about 0.5% by weight or more of R in terms of $R_2O$, about 2.6% by weight or less of Al, about 3.1% by weight or more of B, and about 39.7% by weight or less of Si on the basis of the weight of the glass; the Ni—Zn—Cu ferrite accounts for about 58% to 64% by weight of the glass-ceramic-ferrite composition; the ceramic filler contains quartz and, in some cases, forsterite; the quartz accounts for about 4% to 13% by weight of the glass-ceramic-ferrite composition; and the forsterite accounts for about 6% by weight or less of the glass-ceramic-ferrite composition.

6. The glass-ceramic-ferrite composition according to claim 5, wherein the glass contains about 5.0% by weight or less of R in terms of $R_2O$ on the basis of the weight of the glass.

7. The glass-ceramic-ferrite composition according to claim 5, wherein the glass contains about 7.8% by weight or less of B on the basis of the weight of the glass.

8. The glass-ceramic-ferrite composition according to claim 5, wherein the glass contains about 32.7% by weight or more of Si on the basis of the weight of the glass.

9. The glass-ceramic-ferrite composition according to claim 1, wherein the content of the forsterite in the glass-ceramic-ferrite composition is 1% by weight or more.

10. The glass-ceramic-ferrite composition according to claim 1, wherein the sum of the contents of the Ni—Zn—Cu ferrite and ceramic filler in the glass-ceramic-ferrite composition is preferably about 80% by weight or less.

11. The glass-ceramic-ferrite composition according to claim 10, wherein the sum of the contents of the Ni—Zn—Cu ferrite and ceramic filler in the glass-ceramic-ferrite composition is more preferably about 74% by weight or less.

12. The glass-ceramic-ferrite composition according to claim 1, wherein the sum of the contents of the Ni—Zn—Cu ferrite and ceramic filler in the glass-ceramic-ferrite composition is preferably about 65% by weight or more.

13. The glass-ceramic-ferrite composition according to claim 1, wherein the porosity of the glass-ceramic-ferrite composition is about 7% or less.

14. An electronic component comprising:
   an element body containing the glass-ceramic-ferrite composition according to claim 1; and
   an inner conductor placed in the element body.

15. The electronic component according to claim 14, wherein the inner conductor contains Ag.

16. A method for producing a glass-ceramic-ferrite composition having a peak corresponding to the (511) plane of a magnetite phase in an X-ray diffraction pattern determined using a Cu Kα radiation, the full width at half maximum of the peak being about 0.38° to 0.56°, the method comprising:
   preparing a mixture containing glass, a ceramic filler, and Ni—Zn—Cu ferrite; and
   firing the mixture to obtain the glass-ceramic-ferrite composition,
   wherein the glass contains about 0.5% by weight or more of $R_2O$, where R is at least one selected from the group consisting of Li, Na, and K; about 5.0% by weight or less of $Al_2O_3$; about 10.0% by weight or more of $B_2O_3$; and about 85.0% by weight or less of $SiO_2$ on the basis of the weight of the glass, the Ni—Zn—Cu ferrite accounts for about 58% to 64% by weight of the mixture, the ceramic filler contains quartz and, in some cases, forsterite, the quartz accounts for about 4% to 13% by weight of the mixture, and the forsterite accounts for about 6% by weight or less of the mixture.

17. The method according to claim 16, wherein the mixture is fired at a temperature of about 880° C. to 920° C.

18. A method for manufacturing an electronic component which includes an element body containing a glass-ceramic-ferrite composition and an inner conductor placed in the element body and which has a peak corresponding to the (511) plane of a magnetite phase in an X-ray diffraction pattern determined using a Cu Kα radiation, the full width at half maximum of the peak being about 0.38° to 0.56°, the method comprising:
   preparing a mixture containing glass, a ceramic filler, and Ni—Zn—Cu ferrite;
   forming the mixture into sheets;
   forming a conductive pattern on the sheets using a conductive paste;
   stacking the sheets provided with the conductive pattern to form a multilayer body; and
   firing the multilayer body to obtain the electronic component, which includes the element body containing the glass-ceramic-ferrite composition and the inner conductor placed in the element body,
   wherein the glass contains about 0.5% by weight or more of $R_2O$, where R is at least one selected from the group consisting of Li, Na, and K; about 5.0% by weight or less of $Al_2O_3$; about 10.0% by weight or more of $B_2O_3$; and about 85.0% by weight or less of $SiO_2$ on the basis of the weight of the glass, the Ni—Zn—Cu ferrite accounts for about 58% to 64% by weight of the mixture, the ceramic filler contains quartz and, in some cases, forsterite, the quartz accounts for about 4% to 13% by weight of the mixture, and the forsterite accounts for about 6% by weight or less of the mixture.

19. The method according to claim 18, wherein the mixture is fired at a temperature of about 880° C. to 920° C.

20. The method according to claim 18, wherein the conductive paste contains Ag.

* * * * *